(12) United States Patent  
Lovejoy (10) Patent No.: US 10,395,217 B1  
(45) Date of Patent: Aug. 27, 2019

(54) COMPUTER-BASED MANAGEMENT METHODS AND SYSTEMS

(71) Applicant: MASSACHUSETTS MUTUAL LIFE INSURANCE COMPANY, Springfield, MA (US)

(72) Inventor: David Lovejoy, West Hartford, CT (US)

(73) Assignee: Massachusetts Mutual Life Insurance Company, Springfield, MA (US)

( * ) Notice: Subject to any disclaimer, the term of this patent is extended or adjusted under 35 U.S.C. 154(b) by 215 days.

(21) Appl. No.: 15/280,770

(22) Filed: Sep. 29, 2016

Related U.S. Application Data (60) Provisional application No. 62/234,924, filed on Sep. 30, 2015.

(51) Int. Cl.
*G06Q 10/10* (2012.01)
*G06F 16/2457* (2019.01)
*G06F 16/23* (2019.01)

(52) U.S. Cl.
CPC ........... *G06Q 10/105* (2013.01); *G06F 16/23* (2019.01); *G06F 16/24578* (2019.01)

(58) Field of Classification Search
CPC ............ G06Q 10/105; G06F 17/30345; G06F 17/3053; G06F 17/303; G06F 17/30365
USPC ....................................................... 707/609
See application file for complete search history.

(56) References Cited

U.S. PATENT DOCUMENTS

| | | | | |
|---|---|---|---|---|
| 2008/0177836 A1* | 7/2008 | Bennett | ................. | G06Q 10/06 709/205 |
| 2011/0258308 A1* | 10/2011 | Arumugam | ............. | H04L 67/24 709/224 |
| 2013/0024124 A1* | 1/2013 | Collazo | ................. | G16H 50/30 702/19 |
| 2013/0073344 A1* | 3/2013 | Parent | .................... | G06Q 10/06 705/7.39 |
| 2013/0144645 A1* | 6/2013 | Bjorner | ............... | G06F 19/3431 705/2 |
| 2013/0291060 A1* | 10/2013 | Moore | ................ | G06F 21/6245 726/1 |
| 2014/0200913 A1* | 7/2014 | Budhrani | ............... | G06Q 50/22 705/2 |

(Continued)

*Primary Examiner* — Hosain T Alam
*Assistant Examiner* — Nicholas E Allen
(74) *Attorney, Agent, or Firm* — Eric K. Sophir; Dentons US LLP (57) ABSTRACT

A personnel management system determines an estimated time for return to employability. A server is configured to determine that a user's status has changed from available to unavailable, then the server facilitates a session between the user and an administrator. The server generates a set of inquiries based on user information and the nature of unavailability and evaluates user's responses. The server generates a second set of inquiries based on the responses. The server determines a stage based upon a likelihood of a status change from unavailable to available by evaluating user information and responses. The server generates and transmits a query regarding user's health information and determines a score based on the calculated stage and the health risk factors of the user. The server generates a web page with a set of action items associated with the generated score and modifies user's record based upon the calculated score.

20 Claims, 5 Drawing Sheets

(56) References Cited

U.S. PATENT DOCUMENTS

| | | | |
|---|---|---|---|
| 2014/0336479 A1* | 11/2014 | Ando | A61B 5/4041 600/310 |
| 2014/0344718 A1* | 11/2014 | Rapaport | H04L 51/32 715/753 |
| 2014/0377727 A1* | 12/2014 | Yom-Tov | A61B 5/165 434/236 |
| 2015/0024358 A1* | 1/2015 | Kamiya | A61B 5/165 434/236 |
| 2015/0046181 A1* | 2/2015 | Adjaoute | G06F 19/328 705/2 |
| 2016/0198996 A1* | 7/2016 | Dullen | A61B 5/0024 600/301 |
| 2016/0232806 A1* | 8/2016 | Isaka | G09B 5/06 |
| 2016/0246936 A1* | 8/2016 | Kahn | G06Q 50/22 |

* cited by examiner

COMPUTER-BASED MANAGEMENT METHODS AND SYSTEMS

CROSS-REFERENCE TO RELATED APPLICATION

This application claims priority to U.S. Provisional Patent Application Ser. No. 62/234,924, filed on Sep. 30, 2015, entitled "computer-based personnel management methods and systems."

TECHNICAL FIELD

The present disclosure relates in general to computer-based personnel management methods and systems.

BACKGROUND

Existing computer-based systems for personnel management cannot adequately predict a return time-frame for an employee on disability leave. This is partially due to the fact that the expected return date is based upon a wide variety of factors. For example, the expected return date can be based upon a medical diagnosis or based on the employee's general conditions. In many instances, the health assessment of an employee in view of the employee's overall conditions has proven to change over time. In many other cases, the return expectation date may change during the time that the employee is on disability leave. For example, as the time that an employee is on disability leave increases, it is generally observed that the likelihood of the employee returning to work decreases exponentially; even though the expected return date remains the same and cannot account for this likelihood. Additionally, when an employee claims disability, that employee may initially assess an return expectation date. However, later during the disability leave period, the employee may adjust to the receipt of the disability payment, and lose the inclination to return to work. It is generally observed that as the disability leave time increases, employee becomes more accustomed and comfortable and are less likely to return to work thereby requiring a larger than expected disability payment. As a result, the conventional computer-based personnel management systems cannot properly calculate or determine a status of current and future employees, thereby affecting payroll and workflow.

Furthermore, some conventional computer-based personnel management systems utilize several databases to retrieve information regarding the employees and the disability leave policies, previous cases, and expectations dates. For example, one database may include a record for each employee's work history, another may include information regarding rate of return after disability, others may indicate procedures for similar circumstances or other relevant medical information. Conventional computer-based personnel management systems will inevitably consume a large amount of computing/network resources. There is a need for an efficient method, system, and computer infrastructure to communicate and transmit data between different databases/servers in order to calculate an accurate expected return date is needed.

SUMMARY

Embodiments described herein provide computer-based personnel management methods and systems, which may update a personnel record based upon a calculated predicted date of return and generate a web page for an administrator identifying action items for the user. In one embodiment, a method may comprise a server to determine that a record for a user has a status change from available to unavailable in a first database. The server may transmit a message to an administrator and to the user requesting a session. The server may generate a first set of inquiries based on user information extracted from a second database. The server may generate and transmit an instruction to the second database to generate a second set of inquiries based on user's responses to the first set of inquiries. The server may determine a stage for the user based upon a likelihood of a status change from unavailable to available by evaluating user's responses to the first and the second set of inquiries. The server may generate and transmit a query to a fourth database regarding information associated with the user and user's health. The server may generate a score based on the calculated stage and the information associated with the user's health from the fourth database. The server may generate a web page for the computer associated with the administrator including a set of action items for the user. Furthermore, the server may generate and transmit an instruction, to the first database, to modify the information of the user in the first database regarding user's return expectation date.

In another embodiment, a system may comprise a server to determine that a record for a user has a status change from available to unavailable in a first database. The system may transmit a message to an administrator and to the user requesting a session. The system may generate a first set of inquiries based on user information extracted from a second database. The system may generate and transmit an instruction to the second database to generate a second set of inquiries based on user's responses to the first set of inquiries. The system may determine a stage for the user based upon a likelihood of a status change from unavailable to available by evaluating user's responses to the first and the second set of inquiries. The system may generate and transmit a query to a fourth database regarding information associated with the user and user's health. The system may generate a score based on the calculated stage and the information associated with the user's health from the fourth database. The system may generate a web page for the computer associated with the administrator including a set of action items for the user. Furthermore, the system may generate and transmit an instruction, to the first database, to modify the information of the user in the first database regarding user's return expectation date.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

The present disclosure is herein described in details with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

Described herein is a computer-based personnel management system. System and method embodiments of the computer-based personnel management system may determine return to employability of a user. An insurance service provider may provide payments when disability insurance claims are made by a user in connection with a disability insurance policy. As described hereinafter, the phrase disability insurance may refer to a form of disability insurance that insures a user's earned income against the risk that a disability will prevent him/her from performing work functions. For example, the disability for a blue collar worker may refer to the inability to lift heavy objects while at work, and the disability for a white collar worker may refer to the inability to maintain focus while at work. In other words, the disability may also refer to an illness or other conditions that may cause physical impairment and an inability to work. The disability insurance payments are paid by the disability insurance providers and the disability insurance payments generally continue until the user is able to return to work.

The system and method embodiments of the computer-based personnel management system are configured to assign an administrator (claim examiner) to communicate with the user, the user's employer, and user's doctors upon determining a status change from available to unavailable (that is, receiving the disability insurance claim by the user) to facilitate the user's return to the work as soon as possible. In one implementation, the personality characteristics of the user is matched with a list of administrators personalities, and based on the results of the matching, the administrator is assigned to the user.

The system and method embodiments of the computer-based personnel management system are further configured to obtain healthcare data of the user on determining a status change from available to unavailable (that is, receiving the disability insurance claim by the user). The healthcare data may include data on current medical claims, data related to past medical claims, previous medical claims from a third party administrator, data obtained from user employer, data obtained from user doctor, data obtained from user pharmacy, data obtained from other underwriting companies and/or healthcare providers.

The system and method embodiments of the computer-based personnel management system are further configured to analyze the obtained medical data related to the user using a predictive modeling analysis. The predictive modeling analysis may involve using predictive modeling to find circumstances to which a user may be susceptible. As used herein, the phrase "predictive model" might refer to any class of algorithms that are used to understand relative factors contributing to an outcome, estimate unknown outcomes, discover trends, and/or make other estimations based on a data set of factors collected across prior trials. In an embodiment, the predictive model may refer to methods such as logistic regression, decision trees, neural networks, linear models, and/or Bayesian models.

The system and method embodiments of the computer-based personnel management system are further configured to develop a return to work strategy for the user upon receiving the disability claim request from the user. The return to work strategy may involve activities such as determining the psychological state of the user, treating the user, monitoring the user, and helping the user to return to the workplace as quickly as possible.

In one embodiment, the return to work strategy may be developed based on the present psychological stage of the user. In another embodiment, depending on the present psychological stage of the user, the return to work strategy may be developed by one healthcare entity while another healthcare entity may carry out the return to work strategy. In yet another embodiment, the insurance policy provider and the healthcare management provider may cooperate in developing and carrying out the return to work strategy.

In one example, the insurance policy provider may develop the return to work strategy that may be implemented by the healthcare management provider. In another example, the insurance policy provider uses the return to work strategy to determine which pharmaceutical treatment might be the most appropriate and cost efficient treatment for the user. In other embodiments, the insurance policy provider may work directly with a pharmacy to implement the return to work strategy. In further embodiments, the return to work strategy may be carried out in a cooperative manner by the insurance policy provider and a medical provider.

Figure 1:
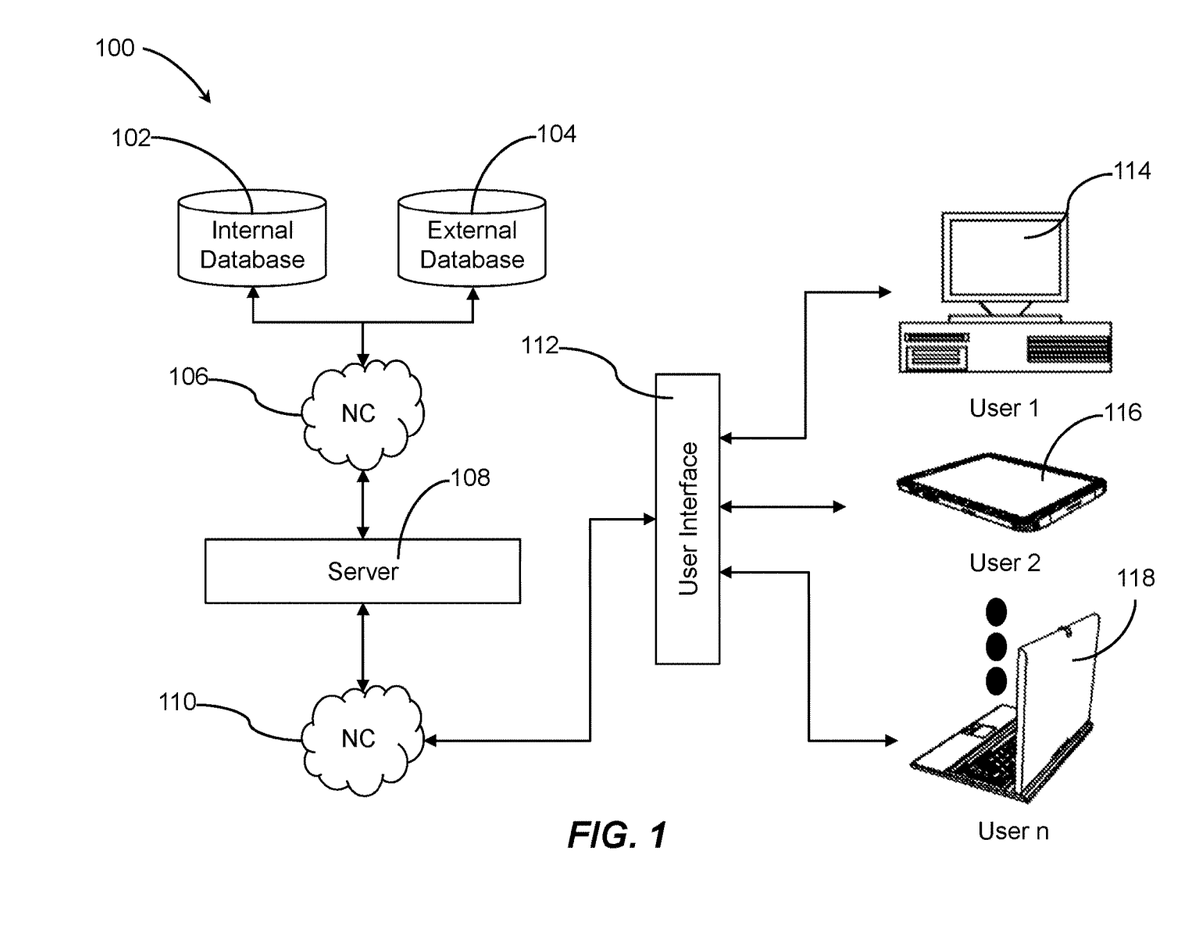
FIG. 1 is an exemplary system architecture of a computer-based personnel management system, according to an embodiment.

FIG. 1 is an exemplary system architecture 100 of a computer-based personnel management system, according to an embodiment. In one embodiment, the system architecture 100 may be owned by an insurance company. The system architecture 100 includes one or more internal databases (for simplicity of explanation only one internal database 102 is shown), one or more external databases 104 (for simplicity of explanation only one external database 104 is shown), a server 108 (Claim Processing Server) comprising the necessary hardware and software to implement the aforementioned database and management system elements, and a plurality of client computing devices, such as a first client computing device 114 (user computer), a second client computing device 116 (administrator computer), and a third client computing device 118, among other components. Examples of firmware and/or hardware and associated software enabling functionality of the aforementioned servers 108 and plurality of client computing devices are detailed in FIG. 2, below. In FIG. 1, a user interface 112 refers to a software application that aids an easier exchange of information between a user and the system 100. Hereinafter, the term "system", "system architecture", and "insurance products management system" may be interchangeably used.

In FIG. 1, the internal database 102 stores data generated by one or more software modules, operating within the computer-based personnel management system. Furthermore, the internal database 102 stores user information and product information which the insurance products management system utilizes for calculating premiums, accrual schedules, and benefit pool's size. The internal database 102 comprises of a first database, a second database, and a third database. In an embodiment, the first database is a non-transitory machine-readable database configured to store records of one or more users, and the second database is a non-transitory machine-readable second database configured to store user information of the one or more users. The external database 104 refers to data that the insurance products management system retrieves from external sources such as social network websites. The external database 104 comprises a fourth database. The server 108 and first, second, and third client computing devices 114, 116 and 118 are operatively coupled to each other through network connections 110. The server 108 is operatively coupled with the internal database 102 and the external database 104 through the network connections 106.

In one embodiment, the system architecture 100 includes a plurality of software modules. The software modules within the system architecture 100 for processing insurance products are a set of computer instructions executed by central processing units that run computer executable program instructions or related algorithms. The software modules within the computer-based personnel management system displays user interfaces 112 on client computing devices, so a user, such as a customer, and an administrator can interact with the computer-based personnel management system.

In some embodiments, the user interacts with user interfaces 112 on client computing devices, via an input device, such as a touch screen, a mouse, a keyboard, and a keypad, among others. The client computing devices can be any computing device such as smartphones, desktop computers, laptop computers, tablets, PDAs, and/or another type of processor-controlled device that may receive, process, and/or transmit digital data.

The internal database 102, and the external database 104 may be implemented through database management systems (DBMS), including MySQL, PostgreSQL, SQLite, Microsoft SQL Server, Microsoft Access, Oracle, SAP, dBASE, FoxPro, IBM DB2, LibreOffice Base, FileMaker Pro, and/or any other type of database that can organize collections of data. The network connections 106 and 110 may refer to any connection between computers including intranets, local area networks (LAN), virtual private networks (VPN), wireless area networks (WAN), and the internet.

Figure 2:
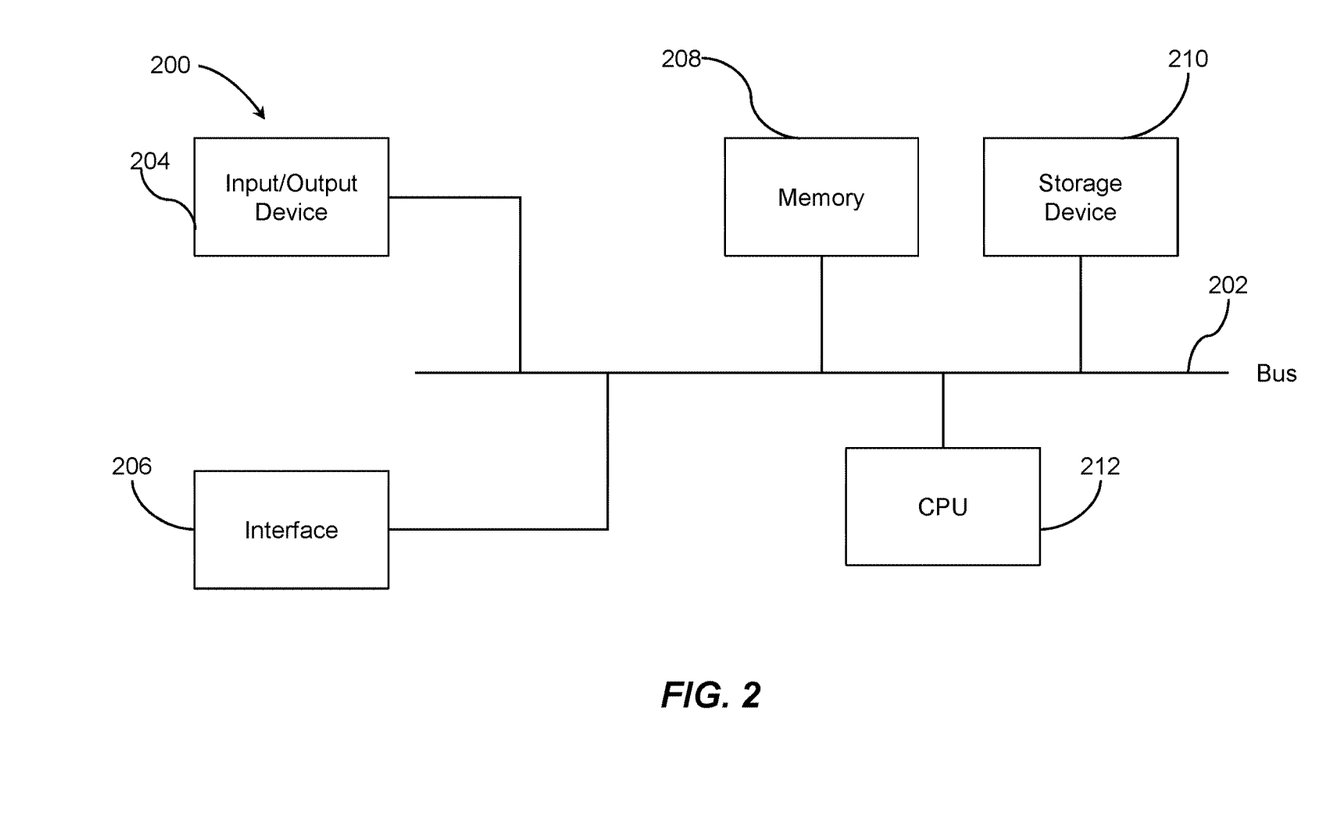
FIG. 2 is an exemplary server device in which one or more embodiments of the present disclosure may operate, according to an embodiment.

FIG. 2 is an exemplary server device 200 in which one or more embodiments of the present disclosure operate. In one embodiment, the server device 200 includes a bus 202, an input/output (I/O) device 204, a communication interface 206, a memory 208, a storage device 210, and a central processing unit 212. In another embodiment, the server device 200 includes additional, fewer, different, or differently arranged components than those illustrated in FIG. 2.

In FIG. 2, the bus 202 is in physical communication with the I/O device 204, the communication interface 206, the memory 208, the storage device 210, and the central processing unit 212. The bus 202 includes a path that permits components within the server device 200 to communicate with each other. Examples of the I/O device 204 include peripherals and/or other mechanisms that enable a user to input information to the computing device 200, including a keyboard, computer mice, buttons, touch screens, voice recognition, and biometric mechanisms. The I/O device 204 also includes a mechanism that outputs information to the user of the computing device 200, such as, for example a display, a light emitting diode (LED), a printer, a speaker, and the like.

Examples of the communication interface 206 include mechanisms that enable the server device 200 to communicate with other computing devices and/or systems through network connections. Examples of the network connections include any connections between computers, such as, intranets, local area networks (LANs), virtual private networks (VPNs), wide area networks (WANs), the Internet, or the like. Examples of the memory 208 include a random access memory (RAM), a read-only memory (ROM), a flash memory, or the like. Examples of the storage device 210 include magnetic and/or optical recording medium, ferro-electric RAM (F-RAM) hard disks, solid-state drives, floppy disks, optical discs, or the like. In one embodiment, the memory 208 and the storage device 210 store information and instructions for execution by the central processing unit 212. In another embodiment, the central processing unit 212 includes a microprocessor, an application specific integrated circuit (ASIC), or a field programmable object array (FPOA). In this embodiment, the central processing unit 212 interprets and executes instructions retrieved from the memory 208 and the storage device 210.

According to some aspects of this embodiment, the server device 200 is implemented as part of a client computing device, an underwriting computer, a claim processing server, or the like. Examples of these implementations include authorized computing devices, smartphones, desktop computers, laptop computers, tablet computers, PDAs, another type of processor-controlled device that may receive, process, transmit digital data, and the like. Additionally, the server device 200 may perform certain operations that are required for the proper operation of the system architecture 100. The server device 200 may perform these operations in response to the central processing unit 212 executing software instructions contained in a computer-readable medium, such as the memory 208. In an example, and referring to FIG. 1, the server device 200 is implemented as the server 108 and may also be implemented as the first, the second, and the third client computing devices 114, 116 and 118 in another embodiment of the present disclosure.

In one embodiment, the software instructions of the computer-based personnel management system are read into the memory 208 from another memory location, such as the storage device 210, or from another server device 200 (e.g., the server 108; or the first, the second, and the third client computing devices 114, 116 and 118) via the communication interface 206. In this embodiment, the software instructions contained within the memory 208 instruct the central processing unit 212 to perform processes that will be described in FIGS. 4-5, below. Alternatively, hardwired circuitry may be used in place of or in combination with software instructions to implement processes described herein. Thus, implementations described herein are not limited to any specific combination of hardware circuitry and software.

Figure 3:
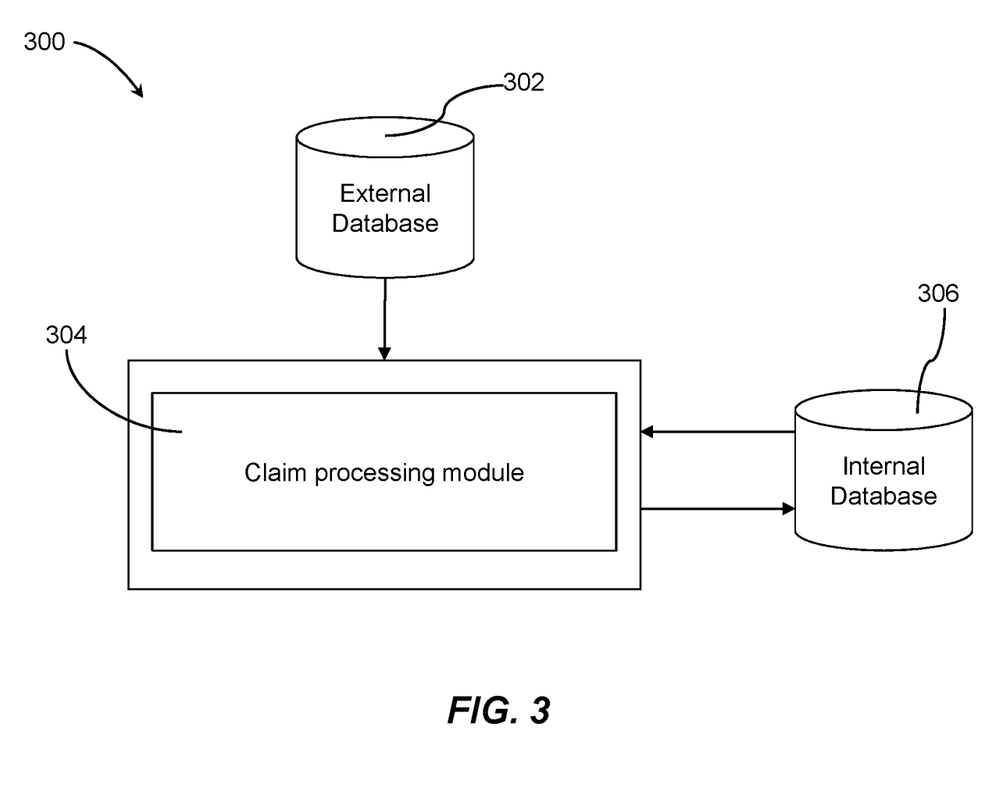
FIG. 3 is an exemplary block diagram of a portion of a claim processing server of a computer-based personnel management system, according to an embodiment.

FIG. 3 is an exemplary block diagram 300 of a portion of a claim processing server of the system architecture 100. The block diagram 300 of the claim processing server includes an external database 302, a claim processing module 304, and an internal database 306. It should be understood that the claim processing module 304 can include less components, more components, or different components in any another embodiment of the present disclosure without moving out from the scope of disclosed embodiments. In an example and referring to FIG. 1, the claim processing module 304 is implemented as a software module executed by the server 108 in the system architecture 100. In FIG. 3, the claim processing module 304 is operatively coupled to and in communication with the internal database 306 and the external database 302.

The claim processing module 304 is implemented as one or more computer software modules that include programmatic rules or logic for executing/running different user interfaces for gathering user data, calculate user disability premium eligibility, calculate user policy's premium, estimate user policy's coverage, calculate user's potential risk, or the like. In one embodiment, the claim processing module 304 is configured to extract the information associated to the user from the internal database 306 and the external database 302. The information extracted by the claim processing module 304 from the internal database 306 comprises name of user, age of user, gender of user, income of user, demographics of user, healthy history of user, and financial history of user. The information extracted by the claim processing module 304 from the external database 302 comprises user preferences, user's habits, user's social networking data, user's financial information, user's demographics, and the like. The claim processing module 304 is also configured to process the benefits (monthly premiums) to be provided to the user based on the identified disability insurance policy of the user.

In these embodiments, the claim processing module 304 is configured to assign an administrator (a claim examiner) to the user based on result of matching. The claim processing module 304 determines the personality characteristics of the user data based on information contained in the extracted data from the internal database 306 and the external database 302. In one example, the personality characteristics of the user is compared with the personalities of a list of administrators. The best matched administrator is assigned to manage the case of the user by the claim processing module 304. In another example, after determining the personality characteristics of the user, the claim processing module 304 will determine from the list of administrators, the administrator with experience of dealing with cases in which the personality and disability of the users is similar to the present user personality and disability. After determining the administrator, the claim processing module 304 will then schedule a session (an interview meeting) between the user and the administrator within a pre-determined time or defined period of time from determining a status change in record of the user from available to unavailable in a first database (which is a part of the internal database 306). The status change in the record of the user occurs upon receiving a disability insurance claim submission by the user. In one example, the pre-determined time is a time before a first disability premium is paid out. In another example, the pre-determined time may be one day, one week, or one month from the data of receipt of the disability insurance claim from the user. Based on the analysis of the user data, the claim processing module 304 generates a set of inquires and present it to the administrator for asking the user.

The claim processing module 304 is configured to collect a set of responses to the set of inquires by the user via a user computer. In another embodiment, the claim processing module 304 is further configured to receive a motivational score of the user by the administrator. The administrator assigns the motivational score to the user based on the session between the user and the administrator. The motivational score is assigned by the administrator based on the administrator assessment of the psychological stage of the user during the session.

The claim processing module 304 may store the set of responses to the set of inquires collected from the user and the motivational score in the internal database 306. The claim processing module 304 is configured to score the set of responses, and compare the set of responses with data (a plurality of model reference scores) stored in a third database to generate evaluated scores of the set of responses. In one embodiment, based on the evaluated scores of the set of responses, the claim processing module 304 is configured to determine a stage of the user from a pre-defined list of plurality of stages. In another embodiment, based on the evaluated scores of the set of responses and the motivational score, the claim processing module 304 is configured to determine a stage of the user from a pre-defined list of plurality of stages. In yet another embodiment, the claim processing module 304 may be configured to determine the stage of the user from the pre-defined list of plurality of stages solely based on the set of responses. In yet another embodiment, the claim processing module 304 may be configured to determine the stage of the user from the pre-defined list of plurality of stages using an algorithm based on a likelihood of a status change from unavailable to available in the first database. In yet another embodiment, the claim processing module 304 may be configured to determine the stage of the user from the pre-defined list of plurality of stages using an algorithm based on the likelihood of the status change from unavailable to available in the first database and the evaluated scores of the set of responses. The plurality of stages may comprise a pre-contemplation stage, a contemplation stage, an action stage, and a maintenance stage. The pre-contemplation stage comprises a stage in which the user is not thinking about getting back to work. The contemplation stage comprises a state of ambivalence of the user. The action stage comprises a stage when the user is ready to get back to the work. The maintenance stage comprises a stage when the user is working.

The claim processing module 304 is further configured to determine a plurality of factors, based on the user information extracted from the internal database 306 and the external database 302. One or more factors are extracted from the plurality of factors and weighted. The claim processing module 304 may assign a score based on the weights of the one or more factors of the plurality of factors and the determined stage. The assigned score is indicative of a time-limit of likelihood of the user returning to the workplace. Based on the assigned score, the claim processing module 304 may determine a time for a second session between the user and the administrator, and further generate a second set of inquiries for the second session between the administrator and the user. In another instance, the claim processing module 304 may determine a time for the second session between the administrator and the user, and the second set of inquires for the second session between the user and the administrator based on the determined stage of the user. The claim processing module 304 is further configured to measure the time taken by the user to move from the determined stage to a next stage.

In another embodiment of the present disclosure, the claim processing module 304 may be configured to determine a set of variables associated to the user based on the user information and the set of response. The claim processing module 304 weight the set of variables based on a plurality of model reference variables. The claim processing module 304 is further configured to generate a predictive model. The predictive model will include the set of weighted variables. In one example, the set of weighted variables may include diagnosis variable, behavioral health variable, event variable, and pharmacy variable. The claim processing module 304 then determines based on the determined stage, and the set of weighted variables in the predictive model, a score indicative of likelihood of the user returning to workplace within a predetermined time period.

In yet another embodiment, the claim processing module 304 is configured to determine a time for the second session and the second set of inquiries based on the determined stage. Further, the claim processing module 304 generate a web page for display on a web browser of an administrative computer of the administrator that comprises a set of action items for the user based on either the calculated score or the determined stage of the user or both. In one example, the set of action items comprises a task for the user to enter a substance abuse program, a task to consult a mental health practitioner, and/or a task to take a specific drug. The claim processing module 304 is further configured to determine one or more techniques to move the user from the determined stage to a next stage, and measure the time taken and techniques utilized to move the user from the determined stage to the next stage.

Process Flowchart for Insurance Product Management System

A plurality of methods implemented by the system for managing personnel are performed by one or more computing devices such as the computing device 200. The methods are implemented with components of the exemplary operating environments of FIGS. 1-3. The steps of this exemplary method are embodied in a computer readable medium containing computer readable code such that the steps are implemented when the computer readable code is executed by a computing device. While the blocks in the disclosed process are shown in a particular order, the actual order may differ. In some embodiments, some steps may be performed in parallel.

Figure 4:
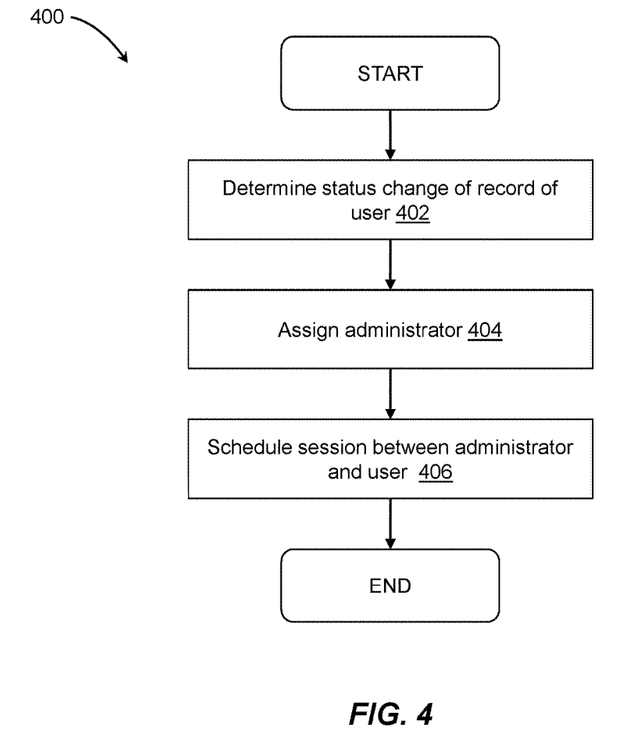
FIG. 4 is a flowchart of a process that may describe an exemplary operation of a computer-based personnel management system for calculating a stage of a user, according to an embodiment.

FIG. 4 is a flowchart of a process that may describe an exemplary operation of a computer-based personnel management system for calculating a stage of a user, according to an embodiment. In these embodiments, a claim processing server in FIG. 3, is configured to present various sets of inquires (questions) to a user, and collect responses via a user computer, and is one means for performing this function.

In FIG. 4, process 400 begins at step 402, when a processor of the claim processing server determines that a record for a user in a first database has a status change from available to unavailable. The status change of the record occurs when a user interface on a user computer is used to input data by the user who interacts with the computer-based personnel management system. The customer data inputted by the user may include a request for disability insurance claims. In one example, the request for disability insurance claim may be in form of an electronic file from the user. In another example, the request for disability insurance claim may be in form of the electronic file from an employer of the user, an insurance agent of the user, or a medical service provider of the user. In one embodiment of the present disclosure, some or all of the information about the disability claim may be received via a third party administrator. In other embodiments of the present disclosure, some or all of the information about the disability claim may be received via an only disability claim submission process or another electronic input source such as transmitting an electronic corpus into the first database.

At step 404, the claim processing server may assign an administrator (claim examiner). Upon receiving the disability insurance claim request, the claim processing server may provide an initial assessment of new disability insurance claim to determine an appropriate claim segment based on complexity, and then identify a particular administrator to process the disability insurance claim. In an embodiment, a recovery profile information may be generated by the claim processing server and provided to the administrator. For example, historical information may be used to generate appropriate recovery profile information based on the specific facts of the disability insurance claim being processed. In another embodiment, the claim processing server may automatically facilitate the assignment of the disability insurance claims to the administrator. For example, the claim processing server may automatically output a recommended claim segment for a received insurance claim, for example to the team manager, which may then be used to facilitate assignment of a particular administrator. As used herein, the term "automated" may refer to, for example, actions that can be performed with little or no intervention by a human. A person skilled in the art will recognize that the assignment may also be based on the skills of an administrator or user's preferences. For example, an administrator experienced in a certain type of disability may be chosen for a user whose disability matches the administrator's experience. In another example, an administrator may be chosen because the administrator can speak the same language as the user.

At step 406, the claim processing server may schedule a session between the administrator and the user. Upon identifying the administrator for managing the disability insurance claim request of the user, the claim processing server may automatically send a message for the session to the administrator computer and the user computer. The message may include a time and date for the session between the administrator and the user. In one embodiment, the claim processing server notifies both the administrator and the user about the time and date of the session. In another embodiment, the claim processing server may notify the administrator about the data and time of the session, and based on the availability and confirmation from the administrator, then notifies the user about the time and date of the session. In yet another embodiment, the claim processing server may check the schedule and availability of the administrator from the information present in the internal database, and based on the free time available for the administrator, sets up the session time and date, and notify both the administrator and the user regarding the session at the same time. In yet another embodiment, the claim processing server, may send a list of proposed time and data for the session to the user, and based on the confirmation from the user, may notify to the administrator about the time and date of the session selected by the user.

The claim processing sever may be further configured to retrieve user information from the internal and/or external databases. The internal and external databases might be associated with, for example, with the user, the user employer, or the insurance policy provider. The internal and external databases may store data associated with the past and current disability insurance claims. In another embodiment, the claim processing server may provide a list of questions to the user. The set of questions generally relate to name, age, and demographic information such as gender, date of birth, and state of residence. The set of questions may further include health related information such as height, weight, and a general health status. The set of questions further relate to financial history of the user. The user may also be asked about the type and details of their existing disability and other insurance policies. The user interface on the user computer may be customized and based on an answer to, a particular question (for example related to the existing insurance policy) the user is presented with additional questions about the type of policy they have, their amount of coverage, the year the policy was purchased, the length of the term, the monthly/annual premium, and the name of the insurance carrier. The responses (answers) to the set of questions is provided by the user. Hereinafter, the term "response", "input" and "answer" may be interchangeably used. In another embodiment, the user and the user employer may be provided with a single set of questions and are ask to provide a single set of answers to the single set of questions. The user and the user employer may be required to provide the inputs to the set of questions at the same time. In another example, the user and the employer may answer the set of questions at different times. The inputs provided by the user are stored by the processor of the claim processing server in the internal database.

Upon receiving the data associated with the user from the internal and external databases along with the inputs to the set of questions by the user, the claim processing server may generate a set of inquiries for the session scheduled between the administrator and the user. It is to be noted that generally the claim processing server may, in one embodiment, only use the data associated with the user extracted from the internal and external databases to generate the set of inquiries. In some embodiments, the claim processing server may also analyze questions that has been asked with other users in the past who either had a similar personality or disability or both as of the present user. In some embodiments, the claim processing server may take the administrator personality characteristics into cognizance while creating the set of inquiries for the session between the user and the administrator. Based on the answers provided by the user to a given inquiry from the set of inquiries, the claim processing server may dynamically change the remaining questions from the first set of inquiries, or may change the order of questions in the remaining inquiries from the set of inquiries. In one embodiment, the claim processing server may generate the set of inquires before the session is scheduled between the administrator and the user. In such a case, the administrator is provided with the set of inquiries before the session. In another embodiment, the claim processing server may generate few inquiries from the set of inquiries before the session between the administrator and the user, and based on the answers provided by the user for the few inquires, the claim processing server may generate additional inquiries during the session. In yet another embodiment, the claim processing server may not generate a single inquiry before the session and only generate the set of inquiries during the session. In one example, the set of inquires may be available to the administrator on his computer screen, and based on the submission by the administrator of a given answer provided by the user for a given inquiry, the claim processing server may change next set of inquires to be asked to the user.

Upon receiving the set of answers to the set of inquires by the user, the claim processing server then calculates a stage of the user from a plurality of stages based on a weighted/ evaluated set of answers. In one embodiment, the claim processing server may evaluate the set of answers received by the user for the set of inquires. In order to evaluate, the set of answers to the set of inquires may be scored by the processor of the claim processing server. In an embodiment, the score for a particular inquiry and its answer represents a qualitative and/or quantitative measure of compliance of the answer with respect to the criteria represented by the inquiry. In one example, the scores may be computed for individual inquires and answers. In another example, the scores may be computed for groups or sections of inquires and answers. In yet another example, a combined average score may be computed for total score of inquires and/or groups of inquires. The scored answers are then stored in the internal database. The scored answers are, in that embodiment, evaluated based on a comparison of the scored answers with a plurality of model reference scores. The processor of the claim processing server retrieves the plurality of model reference scores from a third database (e.g., in one embodiment, a portion of the internal database) in order to do the evaluation and assign an evaluation score. The plurality of model reference scores may comprise of model reference scores for a specific type of disability or user personality. In another example, the model reference scores may be available for a particular category/group of questions. Therefore, depending upon the set of inquires presented to the user, the processor of the claim processing server may retrieve one or more model reference scores related to the set of inquires presented to the user.

Based on the results of the comparison, an evaluation score for the set of answers to the set of inquiries by the user is determined. In one example, the evaluation score may be computed for individual inquires and answers of the user. In another example, the evaluation scores may be computed for groups or sections of inquires and answers of the user. In yet another example, a combined average evaluation score may be computed for total score of inquires and/or groups of questions of the user. In another embodiment of the present disclosure, the answers may be categorized and/or weighted for evaluation. For example, each answer may have a custom weighting factor associated therewith as well as a weighting factor associated with the underlying inquiry. The scores to the inputs may also be weighted such that certain inquires may be more heavily factored into a total score (or category/subtotal score) relative to the other inquires. In one example, certain inquires may have significant weight relative to other inquires if one answer option is provided/ selected but may have minimal weight if a second answer option is provided/selected. Thus, based on the weighted/ evaluated first set of answers, the claim processing server determines the present stage of the user from a plurality of stages. In an embodiment, the plurality of stages may comprise a pre-contemplation stage, a contemplation stage, an action stage, and a maintenance stage. In one embodiment, the pre-contemplation stage comprises a stage in which the user is not thinking about getting back to work. In one embodiment, the contemplation stage comprises a state of ambivalence of the user. In one embodiment, the action stage comprises a stage when the user is ready to get back to the work. In one embodiment, the maintenance stage comprises a stage when the user is working.

Figure 5:
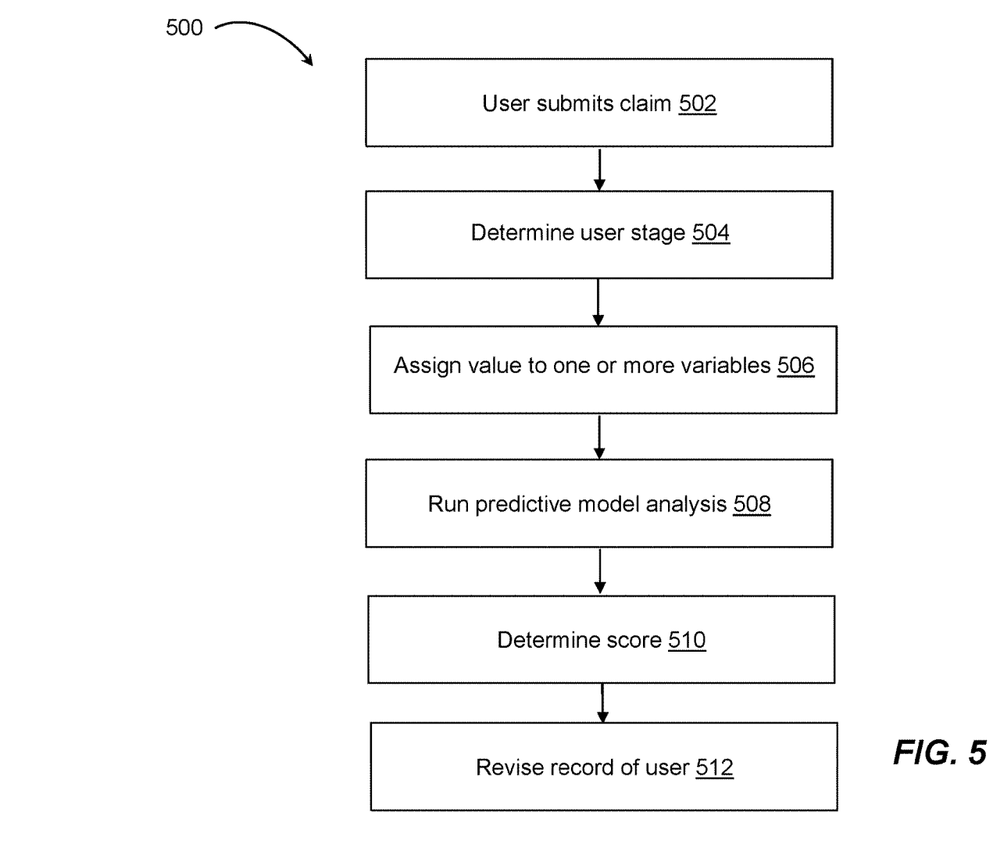
FIG. 5 is a flowchart of a process that may describe an exemplary operation of a computer-based personnel management system for determining likelihood of return to employability of a user, according to an embodiment.

FIG. 5 is a flowchart depicting operational steps of a process that describes an exemplary operation of a computer-based personnel management system for determining likelihood of return to employability of a user, according to an embodiment. In these embodiments, a claim processing server such as the claim processing server illustrated in FIG.

3, is configured to present various sets of inquires (questions) to a user, and collect responses via a user computer, and is one means for performing this function.

At step 502, the claim processing server may receive a data associated with a user submitting a claim such as a disability claim. In an embodiment, this may be accomplished by a user interface on a user computer configured to receive data from the user who interacts with the computer-based personnel management system. In one embodiment, the data inputted by the user includes a request for disability insurance claims. In one example, the request for disability insurance claim may be in form of an electronic file from the user or inputted from another electronic input source such as an electronic file from an employer of the user, an insurance agent of the user, or a medical service provider of the user. In another embodiment, a record for the user in a first database has a status change from available to unavailable when the user submits the request for disability insurance claim.

At step 504, the claim processing server may determine a user stage. The claim processing server, on receiving the disability insurance claim request, may schedule a session between an administrator (claim examiner) and the user. In an alternate embodiment, the claim processing server schedules the session between the administrator and the user on determining the status change from available to unavailable of the user in the first database. Operational steps for determining a stage has been described in FIG. 4.

The claim processing server may generate a set of inquires (questions) for the session between the administrator and the user. The set of inquires are generated based on factors discussed in FIG. 4. A set of answers may be provided by the user for the set of inquires, and based on the set of answers, the claim processing server may determine a current state (psychological) stage for the user. In other embodiment, the claim processing server may assign score/weights to the set of answers, and compare them with a model set of answers. The comparison results are used to identify a psychological stage of the user. Thus, based on the scored set of answers, the claim processing server, in an embodiment, determines the present psychological stage of the user from a plurality of psychological stages using an algorithm. In an embodiment, the plurality of psychological stages may comprise a pre-contemplation stage, a contemplation stage, an action stage, and a maintenance stage. In one embodiment, the pre-contemplation stage comprises a stage in which the user is not thinking about getting back to work. In one embodiment, the contemplation stage comprises a state of ambivalence of the user. In one embodiment, the action stage comprises a stage when the user is ready to get back to the work.

At step 506, the claim processing server may assign a value to one or more factors. The claim processing server extracts the data related to the user from a fourth database. The data extracted is evaluated by the claim processing server to determine a plurality of factors/variables. Hereinafter the term "variable" and "factor" maybe interchangeably used. The plurality of factors are indicative of risk that may prevent the user to return to the workplace or may lead to more time in the recovery of the user from the disability. In another embodiment, the plurality of factors indicative of risk associated to the user are determined from the inputs received from the user for the general set of and the identified data from the internal and external databases. In yet another embodiment, the plurality of factors indicative of risk associated to the user may be determined based on health of the user. In one example, a question may have been asked among the general set of questions related to if the user uses tobacco or nicotine products. Another question may be related to whether the user has seen a doctor for a serious illness in last one year. The questions could add additional levels of specificity such as particular illness such as a cancer or heart disease etc. In another example, the questions could add additional levels of specificity related to financial history such as any previous bankruptcy etc. Thus, the processor may use the inputs for the above mentioned example questions and their answers submitted by the user to determine the plurality of factors indicative of risk.

After determining the plurality of factors for the user indicative of risk, the plurality of factors indicative of risk are then weighted. In one embodiment, each of the plurality of risk factors is preferably predetermined in whole or in part by a software implementing identification of risk factors. In another embodiment, the plurality of risk factors may be categorized into risk categories prior to being weighted. Each risk factor category may include one or more constituent risk factors of the plurality of risk factors. The software implementing identification of risk factors may also consult the administrator of the computer-based personnel management system in the selection of risk factor categories and constituent risk factors and may consider such variables as the business culture in which the computer-based personnel management system operates.

In one embodiment, the weights are assigned to the one or more factors indicative of risk based on a classification model. In another embodiment, an importance value of the each of the plurality of risk factors may be determined based a pre-stored list of the risk factors. The processor of the claim processing server will compare each of the plurality of risk factors in the pre-stored list of the risk factors. For example, if a first risk factor from the plurality of risk factors is found in the pre-stored list of risk factors, then the first risk factor is assigned the importance value associated with the matched risk factor among the list of pre-stored list risk factors. The importance value and the maximum evaluated score for each risk factor may be multiplied in order to obtain a weigh score for each risk factor of the plurality of risk factors. In another embodiment, the importance value and the maximum score for each risk factor may be multiplied in order to obtain a weigh score for each risk factor of the plurality of risk factors. In yet another embodiment, the importance value, the score, and the evaluated score for each risk factor may be multiplied in order to obtain a weigh score for each risk factor of the plurality of risk factors.

At step 508, the claim processing server may conduct a predictive model analysis. In an embodiment, the system and method embodiments of the insurance product management system are configured to analyze the obtained data related to the user from the internal and external databases using a predictive modeling analysis. The predictive modeling analysis may involve using predictive modeling to find conditions to which a user may be susceptible or risky. The predictive model may refer to any class of algorithms that are used to understand relative factors and weights contributing to an outcome, estimate unknown outcomes, discover trends, and/or make other estimations based on a data set of factors collected across prior trials. The predictive model may also refer to methods such as ordinary least squares regression, logistic regression, decision trees, neural networks, generalized linear models, and/or Bayesian models. The inputs to the predictive model is the set of weighted factors/variables and the determined psychological factors. In one embodiment, the predictive model may comprise a cognitive element wherein each of the weights and factors are updated based on other user's relative answers and outcomes. For example, the predictive model may learn, judging by other user's expected return date, relative answers and actual return dates.

At step 510, the processor of the claim processing server may determine a score, indicative of likelihood of the user returning to employability, within a predetermined time period. In an embodiment, this score may be based on the calculated psychological stage and a set of weighted variables in a predictive model. In another embodiment, the processor of the claim processing server uses programmed analytics in order to calculate the score for the user. The programmed analytics may further comprise statistical techniques that may be employed by the processor for the calculation of the score. The programmed analytics are adaptive (e.g., possess cognitive ability) such that the statistical techniques may be changed depending on various factors including but not limited to number of users for which the score is being calculated, the weight of each of the set of variables, the number of the set of variables, the data derived from the user's risk factors, and presence of the risk factors in a defined risk category of one or more risk categories. In addition, the current psychological stage of the user may also be considered in order to calculate the score by the programmed analytics. In another embodiment, the processor employs big data analytics to approximate an score for the user by analyzing a plurality of scores previously calculated for the user.

At step 512, the claim processing server may generate a web page for display on a web browser of the administrative computer of the administrator that comprises a set of action items for the user based on the calculated score. In one example, the set of action items comprises a task for the user to enter a substance abuse program, a task to consult a mental health practitioner, and/or a task to take a specific drug. The claim processing server is further configured to revise the record of the user in the first database to adjust the expectation date based upon the calculated score. In another embodiment, the processing server may schedule an appointment with an administrator and the user as a "follow up." For example, the processing server may transmit the action items and other relevant user data to the administrator or another agent in order to track the progress of the user in a predetermined time period. In another embodiment, the follow up may be used for re-evaluation of the user.

The foregoing method descriptions and the interface configuration are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed here may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description here.

When implemented in software, the functions may be stored as one or more instructions or code on a non-transitory computer-readable or processor-readable storage medium. The steps of a method or algorithm disclosed here may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used here, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined here may be applied to other embodiments without departing from the spirit or scope of the invention. Thus, the present invention is not intended to be limited to the embodiments shown here but is to be accorded the widest scope consistent with the following claims and the principles and novel features disclosed here.

What is claimed is:

1. A computer-implemented method comprising:
determining, by a server, that a record for a user in a first database has a status change from available to unavailable;
upon determining that the record for the user in the first database has the status change from available to unavailable, transmitting, by the server, a message to a computer associated with an administrator and a computer associated with the user requesting a session;
upon establishing the session between an administrator and the user, generating, by the server, a first set of inquiries extracted from a second database based on information associated with the user from the first database, wherein the second database comprises a plurality of inquiries associated with unavailability of the user;
upon evaluating data representing a set of responses to the first set of inquiries by comparing the data representing the set of responses to data in a third database, generating and transmitting a first instruction to the second and third database, by the server, to generate a second set of inquiries, wherein the second set of inquiries is generated based on the set of responses to the first set of inquiries and data representing other user's responses;
determining, by the server, a stage of the user by evaluating the data representing the set of responses to the first and second set of inquiries;
generating and transmitting to a fourth database, by the server, a query regarding information associated with the user's health from a fourth database, wherein the fourth database comprises information associated with the user's heath;
executing, by the server, a predictive model to generate a score based on the calculated stage and the information associated with the user, wherein the score is generated based on weighted risk factors identified within the second, third, and fourth databases, each of weights and factors is updated based on other users' responses and outcomes, and the score is an indicator of a likelihood of the user's status changing from unavailable to available within a predetermined time period;
generating, by the server, a web page for display on a web browser of the computer associated with the administrator comprising a set of action items associated with the generated score; and
generating and transmitting a second instruction, by the server to the first database, to modify the record in the first database associated with user's expectation date, wherein the modification is based upon the calculated score.

2. The computer-implemented method of claim 1, wherein establishing the session between an administrator and the user further comprises selecting, by the server, the administrator from a list of administrators in accordance with the status change in the record.

3. The computer-implemented method of claim 1, wherein establishing the session between an administrator and the user further comprises selecting, by the server, the administrator from a list of administrators in accordance a set of skills associated with the administrator.

4. The computer-implemented method of claim 1, wherein the set of action items comprises at least one of a task to enter a substance abuse program, a task to consult a mental health practitioner, and a task to take a specific drug.

5. The computer-implemented method of claim 1, further comprising initiating, by the server, the set of actions items to move the user from the calculated stage to a second stage.

6. The computer-implemented method of claim 5, further comprising recording, by the server, time taken and action items from the set of actions items utilized to move the user from the calculated stage to second stage.

7. The computer-implemented method of claim 1, further comprising establishing, by the server, a second session between the user and the administrator based on the calculated stage.

8. The computer-implemented method of claim 1, wherein the stage is calculated from a list of a plurality of stages comprising at least one of a pre-contemplation stage, a contemplation stage, an action stage, and a maintenance stage.

9. The computer-implemented method of claim 8, wherein the sessions are continually arranged between the user and the administrator until the user reaches the maintenance stage.

10. The computer-implemented method of claim 1, wherein the information associated with the user in the second database comprises at least one of health information, tobacco use information, and number of doctors visits per year.

11. A system comprising:
a communication network;
a non-transitory machine-readable first database configured to store records of one or more users;
a non-transitory machine-readable second database configured to store user information of the one or more users;
a non-transitory machine-readable third database configured to store inquiries and responses regarding a status change of one or more users;
a non-transitory machine-readable fourth database configured to store user information of the one or more users;
a user computer configured to have a user interface on which are displayed inquires, the user interface configured to dynamically change the inquiries based on inputs submitted for the inquires; and
one or more server computers having one or more processors executing computer readable instructions for a plurality of computer modules over the communication network including a server configured to:
determine that a record for a user in a first database has a status change from available to unavailable;
upon determining that the record for the user in the first database has the status change from available to unavailable, transmit a message to a computer associated with an administrator and a computer associated with the user requesting a session;
upon establishing the session between an administrator and the user, generate a first set of inquiries extracted from a second database based on information associated with the user from the first database, wherein the second database comprises a plurality of inquiries associated with unavailability of the user;
upon evaluating data representing a set of responses to the first set of inquiries by comparing the data representing the set of responses to data in a third database, generate and transmit a first instruction to the second and third database to generate a second set of inquiries, wherein the second set of inquiries is generated based on the set of responses to the first set of inquiries and data representing other user's responses;

determine a stage of the user by evaluating the data representing the set of responses to the first and second set of inquiries;

generate and transmit to a fourth database a query regarding information associated with the user's health from a fourth database, wherein the fourth database comprises information associated with the user's heath;

execute a predictive model to generate a score based on the calculated stage and the information associated with the user, wherein the score is generated based on weighted risk factors identified within the second, third, and fourth databases, each of weights and factors is updated based on other users' responses and outcomes, and the score is an indicator of a likelihood of the user's status changing from unavailable to available within a predetermined time period;

generate a web page for display on a web browser of the computer associated with the administrator comprising a set of action items associated with the generated score; and generate and transmit a second instruction to the first database, to modify the record in the first database associated with user's expectation date, wherein the modification is based upon the calculated score.

12. The system of claim 11, wherein the stage is calculated from a list of a plurality of stages comprising a pre-contemplation stage, a contemplation stage, an action stage, and a maintenance stage.

13. The system of claim 12, wherein the pre-contemplation stage comprises a stage in which the user is not thinking about getting back to work.

14. The system of claim 12, wherein the contemplation stage comprises a state of ambivalence of the user.

15. The system of claim 12, wherein the action stage comprises a stage when the user is ready to get back to the work.

16. The system of claim 12, wherein the maintenance stage comprises a stage when the user is working.

17. The system of claim 11, wherein the server is further configured to assign the administrator for the session in accordance with the status change in the record.

18. The system of claim 11, wherein the server is further configured to select the administrator from a list of administrators in accordance with the status change in the record.

19. The system of claim 11, wherein the set of action items comprises a task to enter a substance abuse program, a task to consult a mental health practitioner, and a task to take a specific drug.

20. The system of claim 11, wherein the server is further configured to initiate the set of actions items to move the user from the calculate stage to a next stage.

* * * * *